United States Patent
Crawford et al.

(10) Patent No.: US 11,543,806 B2
(45) Date of Patent: Jan. 3, 2023

(54) SYSTEM AND METHOD TO FACILITATE A SEARCH FOR A HYBRID-MANUFACTURING PROCESS PLAN

(71) Applicant: Palo Alto Research Center Incorporated, Palo Alto, CA (US)

(72) Inventors: Lara S. Crawford, Belmont, CA (US); Morad Behandish, Foster City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 73 days.

(21) Appl. No.: 17/140,915

(22) Filed: Jan. 4, 2021

(65) Prior Publication Data
US 2022/0214669 A1 Jul. 7, 2022

(51) Int. Cl.
*G05B 19/418* (2006.01)
*B25J 9/16* (2006.01)
*G06F 16/901* (2019.01)
*G06F 16/2453* (2019.01)
*G06F 16/20* (2019.01)

(52) U.S. Cl.
CPC ...... *G05B 19/41865* (2013.01); *B25J 9/1656* (2013.01); *B25J 9/1664* (2013.01); *B25J 9/1666* (2013.01); *G06F 16/20* (2019.01); *G06F 16/24542* (2019.01); *G06F 16/9024* (2019.01); *G06F 16/9027* (2019.01)

(58) Field of Classification Search
None
See application file for complete search history.

(56) References Cited

U.S. PATENT DOCUMENTS

| | | | |
|---|---|---|---|
| 2007/0011123 A1* | 1/2007 | Ruml | G06N 5/003 706/45 |
| 2010/0010952 A1* | 1/2010 | Kuhn | G06Q 10/04 706/47 |
| 2019/0204813 A1* | 7/2019 | Behandish | B33Y 50/00 |

OTHER PUBLICATIONS

Behandish, Morad, Saigopal Nelaturi, and Johan de Kleer. "Automated process planning for hybrid manufacturing." Computer-Aided Design 102 (2018): 115-127. (Year: 2018).*

(Continued)

*Primary Examiner* — Tony Mahmoudi
*Assistant Examiner* — Umar Mian
(74) *Attorney, Agent, or Firm* — Shun Yao; Yao Legal Services, Inc.

(57) ABSTRACT

One embodiment of the present disclosure provides a system and method for facilitating a search for a hybrid-manufacturing process plan for manufacturing an object. During operation, the system can obtain a set of partial order constraints constraining the order in which a set of at least two manufacturing actions, corresponding to addition or removal of predefined regions of space, appear in a process plan. The system can constrain, based on the set of partial order constraints, a search space. The search space can correspond to a tree in which the nodes represent the object's state and the edges represent available actions at each node. The system can then determine a set of optimized process plans represented by orderings of the actions, corresponding to paths on the search tree, that produce the desired final state in a cost-effective manner.

18 Claims, 9 Drawing Sheets

(56) References Cited

OTHER PUBLICATIONS

Chen, YuFeng, ZhiWu Li, and MengChu Zhou. "Optimal supervisory control of flexible manufacturing systems by Petri nets: A set classification approach." IEEE Transactions on Automation Science and Engineering 11.2 (2013): 549-563. (Year: 2013).*

* cited by examiner

| | $P_1$ (AM) | $P_2$ (AM) | $P_3$ (SM) | $P_4$ (SM) | IS IN FINAL DESIGN? | CONSTRAINT(S) |
|---|---|---|---|---|---|---|
| 320 | 0 | 1 | 1 | 0 | NO | $P_2 \rightarrow P_3$ |
| 322 | 1 | 0 | 1 | 0 | NO | $P_1 \rightarrow P_3$ |
| 324 | 1 | 0 | 0 | 1 | NO | $P_1 \rightarrow P_4$ |
| 326 | 1 | 1 | 1 | 0 | NO | $P_1 \rightarrow P_3$ AND $P_2 \rightarrow P_3$ |
| 328 | 1 | 0 | 1 | 1 | NO | $P_1 \rightarrow P_3$ OR $P_1 \rightarrow P_4$ |

| | CONSTRAINT(S) |
|---|---|
| 402 | $P_3 \rightarrow P_5$ |
| 404 | $P_1 \rightarrow P_8$ |
| 406 | $P_1 \rightarrow P_6 \vee P_1 \rightarrow P_7 \vee P_1 \rightarrow P_9$ |
| 408 | $P_1 \rightarrow P_5 \vee P_1 \rightarrow P_7$ |
| 410 | $P_4 \rightarrow P_7 \vee P_4 \rightarrow P_9$ |

| j / i | $P_1$ | $P_2$ | $P_3$ | $P_4$ | $P_5$ | $P_6$ | $P_7$ | $P_8$ | $P_9$ |
|---|---|---|---|---|---|---|---|---|---|
| $P_1$ | 0 | 0 | 0 | 0 | ④ | ② | ⑥ | ① | ② |
| $P_2$ | 0 | 0 | 0 | 0 | 0 | 0 | 0 | 0 | 0 |
| $P_3$ | 0 | 0 | 0 | 0 | ① | 0 | 0 | 0 | 0 |
| $P_4$ | 0 | 0 | 0 | 0 | 0 | 0 | ② | 0 | ② |
| $P_5$ | 0 | 0 | 0 | 0 | 0 | 0 | 0 | 0 | 0 |
| $P_6$ | 0 | 0 | 0 | 0 | 0 | 0 | 0 | 0 | 0 |
| $P_7$ | 0 | 0 | 0 | 0 | 0 | 0 | 0 | 0 | 0 |
| $P_8$ | 0 | 0 | 0 | 0 | 0 | 0 | 0 | 0 | 0 |
| $P_9$ | 0 | 0 | 0 | 0 | 0 | 0 | 0 | 0 | 0 |

| CONSTRAINT(S) |
|---|
| $P_2 \rightarrow P_6$ |
| $P_2 \rightarrow P_7$ |
| $P_2 \rightarrow P_8$ |
| $P_2 \rightarrow P_5 \vee P_2 \rightarrow P_9$ |
| $P_3 \rightarrow P_9$ |
| $P_4 \rightarrow P_7 \vee P_4 \rightarrow P_9$ |
| $P_4 \rightarrow P_5 \vee P_4 \rightarrow P_6 \vee P_4 \rightarrow P_9$ |
| $P_4 \rightarrow P_7 \vee P_4 \rightarrow P_8$ |
| $P_4 \rightarrow P_5 \vee P_4 \rightarrow P_8$ |
| $P_5 \rightarrow P_3$ |
| $P_5 \rightarrow P_1 \vee P_5 \rightarrow P_4$ |
| $P_6 \rightarrow P_1$ |
| $P_6 \rightarrow P_3$ |
| $P_7 \rightarrow P_3$ |
| $P_8 \rightarrow P_1$ |
| $P_8 \rightarrow P_3$ |
| $P_9 \rightarrow P_1$ |

430

|   | $P_1$ | $P_2$ | $P_3$ | $P_4$ | $P_5$ | $P_6$ | $P_7$ | $P_8$ | $P_9$ |
|---|---|---|---|---|---|---|---|---|---|
| $P_1$ | 0 | 0 | 0 | 0 | 0 | 0 | 0 | 0 | 0 |
| $P_2$ | 0 | 0 | 0 | 0 | 2 | 1 | 1 | 1 | 2 |
| $P_3$ | 0 | 0 | 0 | 0 | 0 | 0 | 0 | 0 | 1 |
| $P_4$ | 0 | 0 | 0 | 0 | 20 | 4 | 10 | 24 | 6 |
| $P_5$ | 2 | 0 | 1 | 2 | 0 | 0 | 0 | 0 | 0 |
| $P_6$ | 1 | 0 | 1 | 0 | 0 | 0 | 0 | 0 | 0 |
| $P_7$ | 0 | 0 | 1 | 0 | 0 | 0 | 0 | 0 | 0 |
| $P_8$ | 1 | 0 | 1 | 0 | 0 | 0 | 0 | 0 | 0 |
| $P_9$ | 1 | 0 | 0 | 0 | 0 | 0 | 0 | 0 | 0 |

434

|   | $P_1$ | $P_2$ | $P_3$ | $P_4$ | $P_5$ | $P_6$ | $P_7$ | $P_8$ | $P_9$ |
|---|---|---|---|---|---|---|---|---|---|
| $P_1$ | 0 | 0 | 0 | 0 | 0 | 0 | 0 | 0 | 0 |
| $P_2$ | 0 | 0 | 0 | 0 | 2 | 1 | 1 | 1 | 2 |
| $P_3$ | 0 | 0 | 0 | 0 | 0 | 0 | 0 | 0 | 1 |
| $P_4$ | 0 | 0 | 0 | 0 | 0 | 0 | 0 | 0 | 0 |
| $P_5$ | 1 | 0 | 1 | 0 | 0 | 0 | 0 | 0 | 0 |
| $P_6$ | 1 | 0 | 1 | 0 | 0 | 0 | 0 | 0 | 0 |
| $P_7$ | 0 | 0 | 1 | 0 | 0 | 0 | 0 | 0 | 0 |
| $P_8$ | 1 | 0 | 1 | 0 | 0 | 0 | 0 | 0 | 0 |
| $P_9$ | 1 | 0 | 0 | 0 | 0 | 0 | 0 | 0 | 0 |

FIG. 4B

| CONSTRAINT (S) |
|---|
| $P_2 \rightarrow P_6$ |
| $P_2 \rightarrow P_7$ |
| $P_2 \rightarrow P_8$ |
| $P_2 \rightarrow P_9$ |
| $P_3 \rightarrow P_9$ |
| $P_4 \rightarrow P_6$ |
| $P_4 \rightarrow P_7$ |
| $P_4 \rightarrow P_8$ |
| $P_4 \rightarrow P_9$ |
| $P_6 \rightarrow P_1$ |
| $P_6 \rightarrow P_3$ |
| $P_7 \rightarrow P_3$ |
| $P_8 \rightarrow P_1$ |
| $P_8 \rightarrow P_3$ |
| $P_9 \rightarrow P_1$ |

442

| i \ j | $P_1$ | $P_2$ | $P_3$ | $P_4$ | $P_5$ | $P_6$ | $P_7$ | $P_8$ | $P_9$ |
|---|---|---|---|---|---|---|---|---|---|
| $P_1$ | 0 | 0 | 0 | 0 | 0 | 0 | 0 | 0 | 0 |
| $P_2$ | 0 | 0 | 0 | 0 | 0 | 1 | 1 | 1 | 1 |
| $P_3$ | 0 | 0 | 0 | 0 | 0 | 0 | 0 | 0 | 1 |
| $P_4$ | 0 | 0 | 0 | 0 | 0 | 1 | 1 | 1 | 1 |
| $P_5$ | 0 | 0 | 0 | 0 | 0 | 0 | 0 | 0 | 0 |
| $P_6$ | 1 | 0 | 1 | 0 | 0 | 0 | 0 | 0 | 0 |
| $P_7$ | 0 | 0 | 1 | 0 | 0 | 0 | 0 | 0 | 0 |
| $P_8$ | 1 | 0 | 1 | 0 | 0 | 0 | 0 | 0 | 0 |
| $P_9$ | 1 | 0 | 0 | 0 | 0 | 0 | 0 | 0 | 0 |

SYSTEM AND METHOD TO FACILITATE A SEARCH FOR A HYBRID-MANUFACTURING PROCESS PLAN

STATEMENT OF GOVERNMENT-FUNDED RESEARCH

This invention was made with U.S. government support under (Contract Number) Award Number: HR0011-17-2-0030 awarded by the Defense Advanced Research Projects Agency (DARPA) of the Department of Defense (DoD). The U.S. government has certain rights in the invention.

BACKGROUND

Field

This disclosure is generally related to hybrid manufacturing planning. More specifically, this disclosure is related to a system and method for facilitating a search for a hybrid manufacturing process plan.

Related Art

Computing manufacturing plans for pre-designed 3-dimensional (3D) objects is at the frontier in artificial intelligence (AI). Different types of manufacturing technologies are available for manufacturing complex 3D structures. Specifically, additive manufacturing (AM) technology can be used to manufacture complex 3D objects by adding materials in a layered fashion, e.g., adding material by a 3D printer. Subtractive manufacturing (SM) technology can also be used to manufacture 3D objects by removing material, e.g., by cutting, drilling, grinding, and boring a block of material to a desired form within a specified tolerance. Some manufacturing technologies leverage the advantages of AM and SM by combining the two for fabricating the 3D object. For example, there are hybrid "multi-task" machines on the market that use the same computer numerically-controlled (CNC) motion system with a set of replaceable AM nozzles (e.g., for laser cladding) and SM spindles (e.g., for face/form milling). AM and SM may be performed separately, e.g., by separate machines, and may result in additional re-fixturing and post-processing operations before transitioning from one manufacturing technology or machine to another. Such additional post-processing can result in increased time-to-market and can also increase the cost of manufacturing the 3D object.

With the advancement in manufacturing technologies, new systems can combine AM and SM techniques in a single machine to perform a hybrid manufacturing (HM) process. Current HM approaches typically first complete AM steps to produce a "near-net" shape (which is referred to as a scaffolding process), followed by SM steps to remove the extra support materials and finish the functional surfaces down to proper tolerances. Further, an approach that would allow interleaving of AM and SM steps in nontrivial ways would increase the range of 3D objects that can be manufactured or enable more cost-effective manufacturing by optimization of how these steps are ordered. The process of determining the existence of such an ordering and its optimization can be referred to as HM process planning. Performing HM process planning in an efficient manner is challenging.

SUMMARY

One embodiment of the present invention provides a system and method for facilitating a search for a hybrid-manufacturing process plan for manufacturing an object. During operation, the system can obtain a set of partial order constraints constraining an order in which a set of at least two manufacturing actions, corresponding to addition or removal of predefined regions of space, appear in a process plan. The system can constrain, based on the set of partial order constraints, a search space. The search space can correspond to a tree in which nodes represent the object's state and edges represent available actions at each node. The system can then determine a set of optimized process plans represented by orderings of the actions, corresponding to paths on the search tree, that produce a desired final state in a cost-effective manner.

In a variation on this embodiment, the manufacturing actions are defined as Boolean operations of the object's state with pre-defined regions of primitives. The intersection of the primitives produces a plurality of atoms.

In a further variation on this embodiment, the atoms are represented by binary strings that encode inclusion in the primitives. The state of the manufactured shape at each node and the desired target shape are represented in terms of binary strings of inclusions of atoms.

In a further variation on this embodiment, the system can perform, at each node of the search tree, one or more of the following: determining an action that is applied and satisfies all pre-conditions imposed by the set of partial order constraints; determining the change in the state of a manufactured shape after applying the action; updating the set of partial order constraints for remaining primitives; and determining a set of available primitives for subsequent actions.

In a further variation, the system can prune the search space by discarding primitives as potential actions at a given node, based on the updated partial order constraints, available primitives, and pruning strategies.

In a further variation on this embodiment, the system can identify combinations of primitives with different orderings that result in duplicate states in process plans. The system can then retain at least one combination of the primitives corresponding to the duplicate state while discarding remaining combinations.

In a further variation on this embodiment, the system can determine, based on a cost function, a set of optimal process plans that satisfy the set of partial order constraints, wherein the cost function depends on actual atoms that each primitive adds or removes.

In a variation of this embodiment, the system can calculate a cost of each action by multiplying a cost-per-unit-volume of the action by a volume of atoms added or removed by that action. The system can then calculate a total cost at each node by summing up costs of all previous actions.

In a variation on this embodiment, the system can estimate, based on a heuristic function, a cost of remaining actions at each node by: determining, for each atom, a minimum number of flips to satisfy the desired final state, wherein an atom flip can correspond to addition or removal of the atom; and multiplying a cost-per-unit-volume of a cheapest available action by the number of flips per atom and the volume of the flipped atoms to estimate a lower bound to a remaining cost.

In a further variation on this embodiment, the set of partial order constraints at each node is represented by a constraint matrix whose entries are binary strings. The binary strings encode a logical statement that combines the partial order constraints via disjunctions and conjunctions.

BRIEF DESCRIPTION OF THE FIGURES

FIG. 4A shows an example of a constraint matrix corresponding to a set of partial order constraints, in accordance with one embodiment of the present disclosure.

FIG. 4B shows an example of a set of partial order constraints and constraint matrices associated with a parent node and a child node in a search tree, in accordance with one embodiment of the present disclosure.

FIG. 4C shows an example of a set of partial order constraints and a corresponding constraint matrix associated with a different child node in a search tree, in accordance with one embodiment of the present disclosure.

In the figures, like reference numerals refer to the same figure elements.

DETAILED DESCRIPTION

Figure 1:
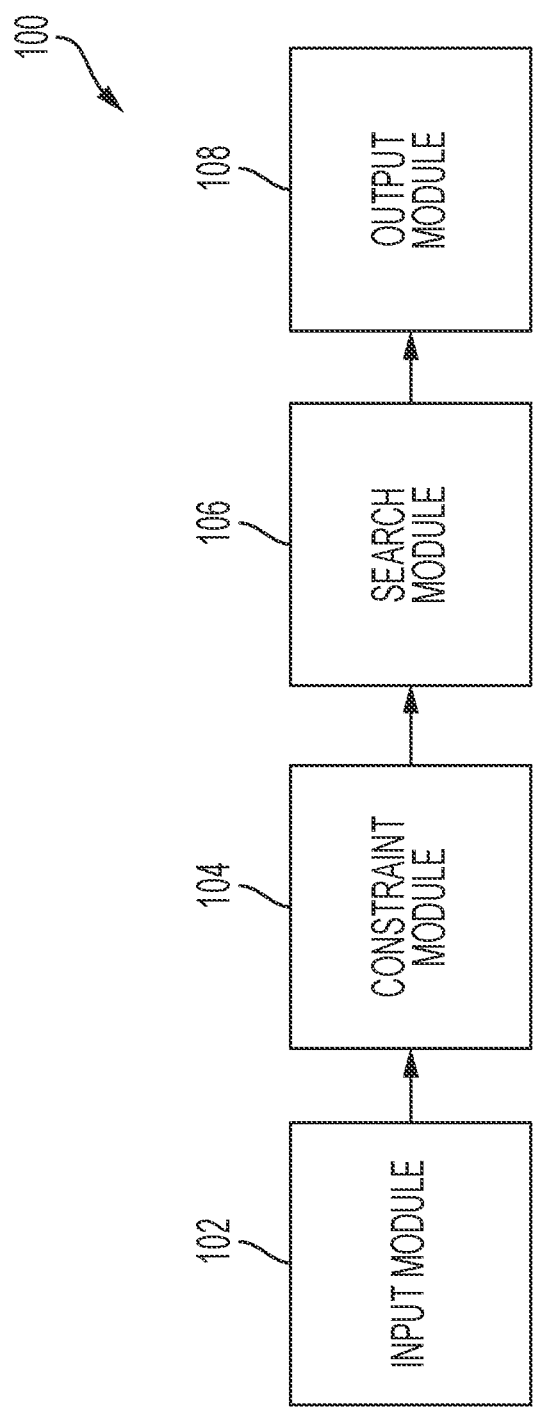
FIG. 1 shows an exemplary system block diagram for determining a cost-effective HM process plan, in accordance with one embodiment of the present disclosure.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments described herein solve the technical problem of determining hybrid manufacturing (HM) process plans for manufacturing an object using a set of additive and subtractive manufacturing (AM/SM) actions. Specifically, a system can determine a sequence of AM/SM actions in a cost-effective and efficient way to manufacture the object. As described in U.S. Pat. No. 10,719,069, each manufacturing action is defined as Boolean set operations with a manufacturing "primitive" defining a three-dimensional (3D) region of influence (ROI) for the action. Every AM action is defined as a set union with a given AM primitive, whereas every SM action is defined as a set difference with a given SM primitive. Each primitive is computed by analyzing the geometry of the target shape against the tool shape, machine degrees of freedom, and possibly other manufacturing parameters. The primitives and their complements are intersected to generate a decomposition of the 3D space, called canonical or "atomic" decomposition. Each manufacturing "atom" corresponds to a set of points in 3D space that is classified in the same way against all primitives in terms of inclusion.

In one embodiment, the atoms may be encoded as a sequence of binary digits that classify the atom, e.g., given four primitives, an atom encoded "1001" can be included inside first and fourth primitives and excluded from second and third primitives. A necessary condition for the existence of an HM process plan that generates a desired final state including a subcollection of atoms is an approximation of the target shape, using those atoms, within user-specified tolerances. During operation, the system may derive a set of partial order constraints that define how the AM/SM actions, corresponding to AM/SM primitives can be ordered in an HM process plan to ensure that the process plan generates the target shape. The set of partial order constraints may be represented by a constraint matrix relating the primitives with each primitive affecting one or more atoms included in that primitive. In other words, each primitive in the set of primitives adds or removes a subcollection of atoms representing the ROI for a single AM/SM action, respectively. The atoms represent the smallest spatial regions that can be added or removed as a unit, however, they cannot necessarily be added or removed independently. They are physically constrained to be added or removed alongside other atoms in a primitive representing a feasible manufacturing action.

An HM process plan (or simply a "plan") is defined by a sequence of manufacturing actions represented by AM/SM primitives. A plan is "valid" if it represents a meaningful sequence of AM/SM actions, e.g., a Boolean formula that makes use of AM primitives via set unions and complements of SM primitives via set intersections. A plan is "feasible" if it produces the target shape, or an approximation of it as deemed sufficiently accurate by user-specified tolerances or other design constraints. A necessary and sufficient condition for a plan to be feasible is to have every atom inside the target shape present in the outcome of the Boolean formula, and every atom outside the target shape absent at the end of the Boolean formula. This condition can be specified by a constraint matrix obtained by analyzing how the order of primitives in the sequence affects the presence or absence of atoms at the end of the plan. In other words, the presence or absence of atoms at the end of the plan and their addition or removal by different primitives necessitates a certain set of order relations between the application of those primitives. HM process planning may thus be reduced to finding plans that satisfy such relations.

There may exist more than one feasible plan that satisfies the partial order constraints, thus results in the same subcollection of atoms being present at the end of the plan. These feasible plans may have different costs associated with them because the actual number of times a given atom may be turned on/off by different primitives that contain that atom may be different from one feasible plan to another. Each primitive may be associated with a different cost per unit volume of the atoms that it affects, depending on a number of process parameters. A feasible plan is "cost effective" if it is cheap enough, which may be defined in different ways depending on manufacturing budget, computational budget, and optimality criteria. A feasible plan is "near-optimal" (or "optimal") if it is relatively cheaper than most other (or all other) feasible plans. A feasible plan is "optimized" if it is obtained by applying an optimization process, including a combinatorial search or numerical optimization, subject to feasibility constraints.

HM process planning may refer to facilitating an efficient and compact search for finding one or more optimized, near-optimal, or optimal HM plans, or any distinguished subset of cost-effective plans. More specifically, a search space can be restricted based on an efficient representation of the set of feasibility constraints, thereby resulting in an efficient search for cost-effective, near-optimal, or optimal plans.

System Architecture

FIG. 1 shows an exemplary system block diagram for determining a cost-effective HM process plan, in accordance with one embodiment of the present disclosure. In the example shown in FIG. 1, system 100 can include an input module 102 that can define a set of manufacturing primitives, atoms, and desired as-manufactured configuration in terms of active and inactive atoms, e.g., atoms that are included and excluded from the desired final state. In one possible embodiment, the constraint module 104 can convert the input to a set of partial order relations that constrains the order in which the AM/SM actions, using AM/SM primitives, may appear in a feasible HM process plan. These constraints are input to the search module 106 which can enumerate one or more HM process plans that satisfy those constraints, hence generate the desired final state. In one embodiment, the partial order relations may be directly given as input to the search module 106. Specifically, an HM process planning problem can be formulated using a set of primitives P and a set of atoms A:

$$P = \{P_1, P_2, \ldots, P_n\}, \quad (1)$$

$$A = \{a_1, a_2, \ldots, a_m\}. \quad (2)$$

Primitives can be grouped into two categories, additive manufacturing (AM) primitives and subtractive manufacturing (SM) primitives. An AM primitive or an SM primitive can characterize the region of influence of a manufacturing action. The shape of the ROI is determined by the shape of the target design and the manufacturing capability (e.g., 3D printing, milling, or turning). For the purpose of defining the HM constraints, an as-designed object that is to be manufactured can be divided into volumetric regions called atoms, each of which can have a different shape and size. Specifically, an atom can represent a volumetric region in the Euclidean space that is classified as completely inside or completely outside against all primitives, i.e., the one or more primitives that include that atom will add/remove the atom upon the AM/SM action, respectively.

Each atom is defined by a conjunctive Boolean formula on the primitives, and can optionally be denoted by a ternary label to designate it as being "in the design" (or "active"), "not in the design" (or "inactive") or "does not matter" (i.e., does not pose a constraint on the process plans).

System 100 can include a constraint module 104 to provide an efficient representation of the set of partial order constraints in the form of an n×n constraint matrix form X, whose rows and columns represent the primitives available for manufacturing the as-designed object, and the entries denoting requirements on different partial orderings of a subset of primitives. Furthermore, each partial ordering constraint in the constraint matrix X can be represented as a combination of bits that can be denoted as an integer. The logic used for setting different bits in a binary string is described in relation to FIG. 4A.

Furthermore, a cost model can be defined for adding or removing material during the process of manufacturing the object. For example, a simple cost multiplier factor for each primitive can be used so that the cost of removing or adding a unit of volume can be proportional to the unit of volume. Hence, the cost of adding or removing a given atom is computed by multiplying the cost factor of the primitive that adds or removes that atom by the volume of the atom. Other embodiments with different cost models are possible without affecting the remaining parts of the method. For example, more sophisticated cost models may be employed that depend on build direction, support structure, layer thickness, minimum feature size, temperature history, material properties, and deposition trajectory (for AM); accessibility, feed and speed, tool path, tool/machine wear and tear, operator time, and fixturing (for SM); and hybridization parameters such as cost of changing from one fixturing setup or machine to another.

System 100 can include a search module 106 to perform a combinatorial search for a plurality of optimized HM process plans. Specifically, search module 106 can explore a search space to find total orders that satisfy all of the constraints in terms of partial order relations among the primitives. Search module 106 can prioritize visiting solutions in the search space based on one or more intelligent heuristics specified for an HM problem to enhance the efficiency of the search. In one embodiment, search module 106 can enumerate all feasible HM process plans, with or without ranking them based on cost. In another embodiment, search module 106 can incorporate costs in the combinatorial search to determine a plurality of optimal or near-optimal solutions automatically without visiting all possible solutions. For example, an A* (A-star) search algorithm can be used along with the cost and heuristic models to increase the likelihood of visiting more cost-effective solutions early on. In one embodiment, the heuristic can be defined in terms of the difference between the current state of the evolving part (in terms of active and inactive atoms) and the target state, by computing the lower-bound to the remaining cost in terms of the remaining atoms (to be added or removed) and the minimum cost factor of the available primitives. System 100 can then apply an output module 108 to identify and output at least one HM process plan, e.g., one or a few of the most cost-effective feasible plans, or a ranked set of many or all feasible plans.

Example of a Hybrid-Manufacturing Process Plan

Figure 2A:
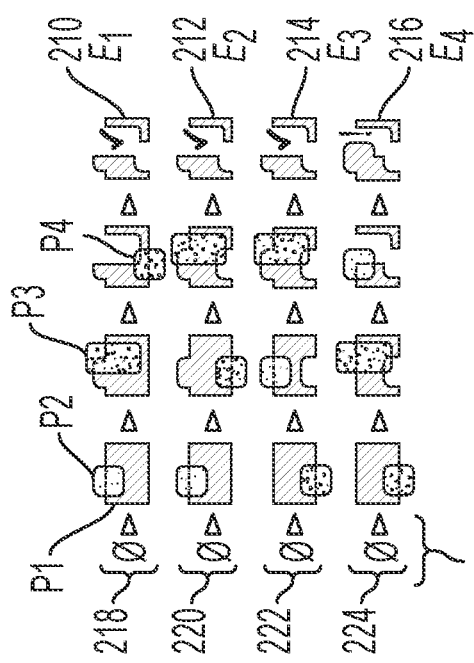
FIG. 2A shows an example schematic of different HM process plans using different orderings of four manufacturing primitives, in accordance with one embodiment of the present disclosure.

FIG. 2A shows an example schematic of different HM process plans using different orderings of four manufacturing primitives, in accordance with one embodiment of the present disclosure. In the example shown in FIG. 2A, four hybrid-manufacturing plans, i.e., 218-224, are shown, with each plan including a different ordering of primitives, i.e., $\{P_1, P_2, P_3, P_4\}$. For example, primitives $P_1$ and $P_2$ can correspond to additive manufacturing operations, while primitives $P_3$ and $P_4$ can correspond to subtractive manufacturing operations. Each plan can optionally start with an empty space, 202, and a first additive primitive, $P_1$, in each of the four plans can add a block of material to empty space

202. For plan 218, after adding a block of material using additive primitive $P_1$, another block of material can be added using additive primitive $P_2$. Then subtractive primitives $P_3$ and $P_4$ are applied sequentially to obtain a desired end state 210. Plans 220 and 222 apply a different ordering of the primitives to get to the same desired end state, i.e., 212 and 214, respectively. However, the ordering of the primitives applied for plan 224 can result in a different final state 216 when compared to the desired/target final state, e.g., 210. Therefore, proper ordering of the primitives is important in planning an HM process for manufacturing a target shape.

Figure 2B:
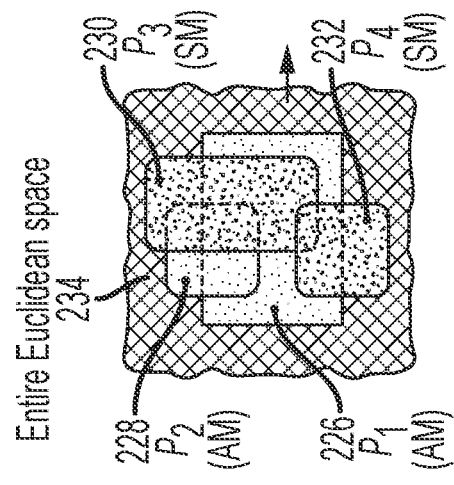
FIG. 2B shows an example schematic of overlapping the four manufacturing primitives in FIG. 2A, in accordance with one embodiment of the present disclosure.
Figure 2C:
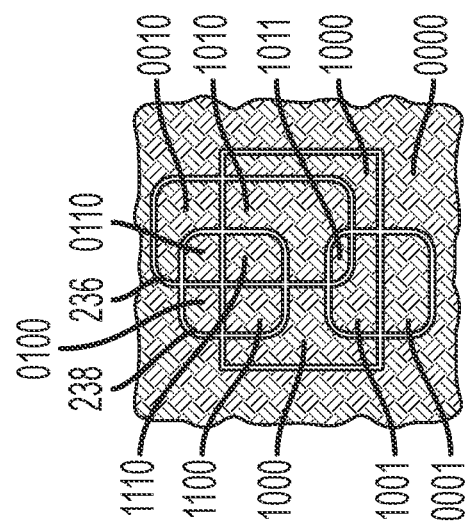
FIG. 2C shows an example schematic of a plurality of manufacturing atoms that result from intersection of the manufacturing primitives in FIG. 2B and their complements, in accordance with one embodiment of the present disclosure.

FIG. 2B shows an example schematic of overlapping the four manufacturing primitives in FIG. 2A, in accordance with one embodiment of the present disclosure. The example shown in FIG. 2B, provides a visual representation of four primitives used in FIG. 2A, i.e., $P_1$ 226, $P_2$ 228, $P_3$ 230, $P_4$ 232, in the Euclidean space 234. The regions of overlap among the primitives in the Euclidean space 234 can be represented as a number of atoms. FIG. 2C shows an example schematic of a plurality of manufacturing atoms that result from intersection of the manufacturing primitives in FIG. 2B and their complements, in accordance with one embodiment of the present disclosure. The binary codes represent different spatial volumes resulting from overlap among the four primitives, i.e., $\{P_1, P_2, P_3, P_4\}$, in other words each binary code can correspond to an atom. For example, a subtractive primitive $P_3$ removes five atoms at one time represented by $\{0110, 1110, 1010, 1011, 0010\}$, where 0110 encodes the atom as the volumetric region that is outside $P_1$, inside $P_2$, inside $P_3$, and outside $P_4$, and similarly 1110, 1010, 1011, and 0010 encode the other atoms in terms of their inclusions against all primitives, all of which have their third digit commonly equal to 1 because they are inside $P_3$. In other words, each primitive can add or remove a group of atoms together, where each atom is described by a binary string (0 or 1 bits) that represent its inclusion (outside or inside, respectively) against all primitives. When a HM system applies a correct ordering of the given primitives to manufacture the target shape, the system can achieve the end goal of having every atom inside the target shape present and every atom outside the target shape absent at the end of a process plan.

Search Technique Using Constraint Matrices and Search Heuristics

Figure 3A:
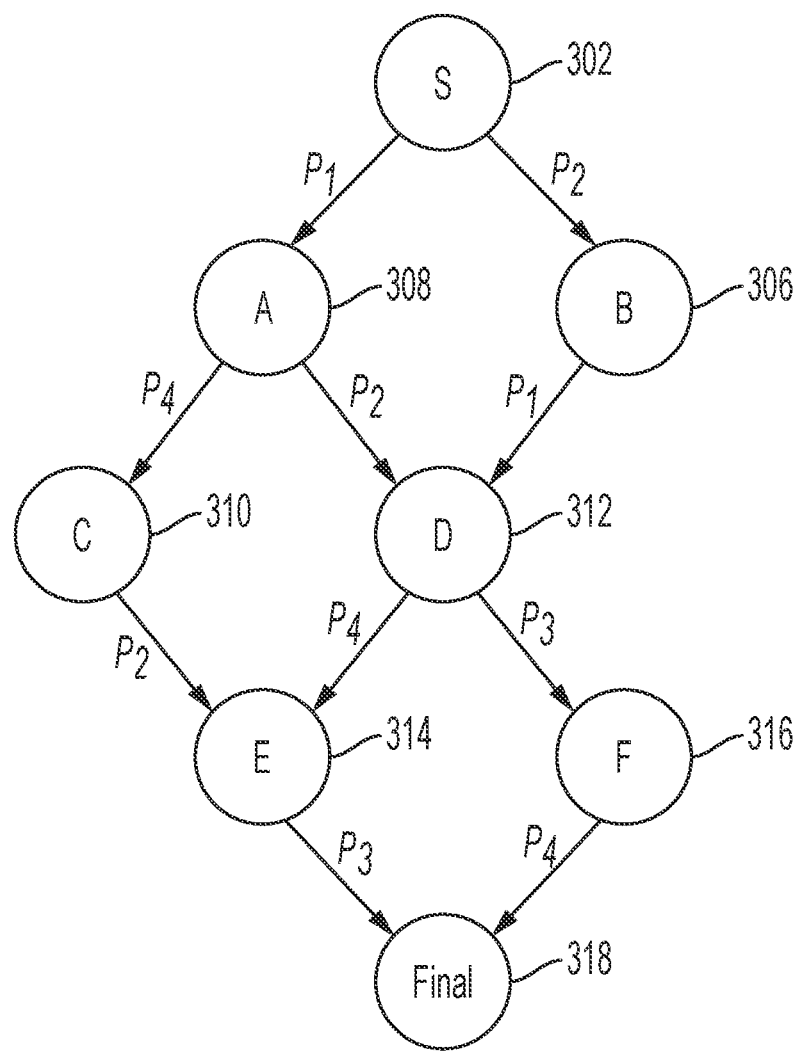
FIG. 3A shows an example of a search tree representing the initial, intermediate, and final states, illustrated as nodes, and a plurality of HM process plans, obtained by following paths along the arrows, in accordance with one embodiment of the present disclosure.

FIG. 3A shows an example of a search tree representing the initial, intermediate, and final states, illustrated as nodes, and a plurality of HM process plans, obtained by following paths along the arrows, in accordance with one embodiment of the present disclosure. In the example shown in FIG. 3A, an HM system can apply an A* search technique or alternative heuristic search techniques to search for one or more cost-effective HM process plans.

For example, the A* search can search over a set of nodes, each of which corresponds to a configuration of atoms that represent an intermediate state of the manufactured shape. The nodes are connected in the search tree by actions corresponding to primitives. The configuration information associated with each node can indicate whether the atoms are inside or outside a partially manufactured part. Such configuration information can be represented as a binary string (or by equivalent efficient representations tailored to the programming language). Each operation or action in the search can correspond to adding or removing atoms in the ROI of a primitive to a specific configuration of atoms. If a primitive corresponds to an additive operation, then the atoms included in the primitive can be set to active, regardless of their previous status. If the primitive corresponds to a subtractive operation, then the atoms included in the subtractive primitive can be set to inactive, regardless of their previous status. The previous status is still important to calculate the cost. The cost associated with each operation can be calculated by multiplying a total volume of all the atoms that are flipped (from inactive to active or vice versa) with a cost factor per unit volume of an associated primitive.

In the example shown in FIG. 3A, the search can start from a node 302 representing an empty set (or a block of material) in the Euclidean space and a number of operations can be performed to expand the search tree. For example, primitives $P_1$ and $P_2$ can correspond to additive operations that can add a block of material, corresponding to the atoms included in these primitives, to the empty space to result in two different configurations indicated by nodes A 308 and B 306, respectively. From each of nodes A 308 and B 306 another set of actions can be performed to result in a different configuration of atoms in the Euclidean space. In other words, a node's child nodes can represent all the states that can be reached by applying different available primitives. The search technique can traverse through different paths, i.e., a path in the search tree can correspond to a sequence of primitives feasible in the search tree to reach a final node 318 via one or more nodes, e.g., via the sequence of nodes A 308, D 312, and F 316.

At each node in the search tree, the possible actions or primitives that can be applied can be determined based on a number of strategies. These strategies can enable restricting the search space to enhance the efficiency of the algorithm, but they are not required for the algorithm to work effectively. Some of them are more important or effective than others, and depending on the problem, some or all of them can be employed. For example, at each node a system implementing the search technique can limit selection of primitives to those that have not already been used in manufacturing the object. The system may discard one or more primitives to improve the efficiency of the search and restrict the search space, however, the system may discard primitives only at the beginning of the search tree to enhance efficiency, although other strategies may be employed in alternative embodiments. The system may assume that all primitives that have not been discarded are to be used. The system may not use a primitive if a constraint matrix associated with a state or space configuration at the node includes pre-conditions that are not satisfied, such as other primitives that must be used before the considered primitive. The system may not use a primitive if the primitive would not change the state of the partially manufactured part on which the primitive operates. Furthermore, the system may not use a primitive if the primitive would not change at least one atom in a direction toward a desired state. Other strategies for improving the algorithm efficiency may be employed.

When the system applies multiple primitives including both additive and subtractive primitives to a region of Euclidean space including one or more atoms, the order in which these primitives are applied determines whether an atom included in the common region of the primitives will be inside or outside of the final manufactured shape. If an atom is desired to be present in the final state, then the system must apply at least one additive primitive after all of the subtractive primitives to achieve this desired end state. Alternatively, if an atom is desired to be absent in the final design, then the system must apply at least one subtractive primitive after all of the additive primitives to achieve this desired end state. Such requirements generate partial order constraints on the order in which the primitives can be applied. In one embodiment, multiple constraints that are to be satisfied simultaneously can also be generated corresponding to each atom.

Figures 3B, 3C:
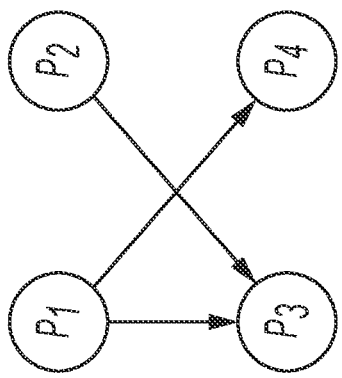
FIG. 3B shows an example of a table including binary encodings of the manufacturing atoms in FIG. 2C, their inclusion in the final design, and a set of partial order constraints inferred from the encodings and inclusion, in accordance with one embodiment of the present disclosure.
FIG. 3C presents a directed graph representing the set of partial order constraints shown in FIG. 3B, in accordance with one embodiment of the present disclosure.

FIG. 3B shows an example of a table including binary encodings of the manufacturing atoms in FIG. 2C, their inclusion in the final design, and a set of partial order constraints inferred from the encodings and inclusion, in accordance with one embodiment of the present disclosure. In the example shown in FIG. 3B, two additive primitives $P_1$ and $P_2$, and two subtractive primitives $P_3$ and $P_4$, are considered for illustrating the generation of constraints for manufacturing a simple object. Specifically, FIG. 3B illustrates how a constraint can be generated based on a desired state of an atom in the final design.

For example, when an atom is not desired to be present in the final design, the ordering of the primitives may have to be selected in such a way that one or more subtractive operations follow all the additive operations with that atom in their ROIs. In the example shown in FIG. 3B, five different atoms are considered. For the atom encoding 320, the atom is not present in the final design, so additive primitive $P_2$ precedes the subtractive primitive $P_3$, thereby satisfying the final design constraint. The partial order constraint imposed by the atom encoding 320 can be represented as $P_2 \rightarrow P_3$. This atom does not impose any constraints on the primitives $P_1$ or $P_4$, on the other hand, because they do not affect the atom.

The constraint associated with the atom encoding 320 corresponds to a single partial ordering constraint. However, there can also be constraints that are combined with "AND" or "OR" clauses, for example the constraints associated with the atom encodings 326 and 328 include "AND" and "OR" clauses, respectively. The atom encoding 326, implies that three primitives affect the atom. Two of these primitives $P_1$ and $P_2$ are additive while the other one $P_3$ is subtractive. This atom is desired to be absent in the final state, therefore it is necessary that $P_1$ precedes $P_3$ and $P_2$ precedes $P_3$. This constraint can be denoted as $P_1 \rightarrow P_3$ AND $P_2 \rightarrow P_3$. Similarly, the atom encoding 328, implies that three primitives affect the atom. One of these primitives $P_1$ is additive while the other two $P_3$ and $P_4$ are subtractive. This atom is desired to be absent in the final design, therefore it is necessary that $P_1$ precedes $P_3$ or $P_1$ precedes $P_4$. This constraint can be formulated as $P_1 \rightarrow P_3$ OR $P_1 \rightarrow P_4$. Some of the partial order constraints obtained this way can be redundant and may be consolidated by the constraint module 104. The final set of constraints for the example shown in FIG. 3B can be denoted as: $P_1 \rightarrow P_3$ AND $P_1 \rightarrow P_4$ AND $P_2 \rightarrow P_3$. A graphical representation of these constraints is shown in FIG. 3C.

FIG. 3C presents a directed graph representing the set of partial order constraints shown in FIG. 3B, in accordance with one embodiment of the present disclosure. The set of partial order constraints can be represented as a directed graph when no "OR" clauses are included in the constraints. An edge in the directed graph can denote an ordering of primitives, e.g., an edge $P_1 \rightarrow P_2$ can indicate that primitive $P_1$ must be applied before primitive $P_2$. In the example shown in FIG. 3C, allowable orderings of the primitives correspond to topological sorts of the graph, which means the set of total orderings of the primitives that satisfy the partial ordering. The constraint graph can be extended to constraints combined using both "AND" and "OR" by depicting every group of partial order constraints combined with "OR" as different types of edges in the directed graph with the corresponding edges labeled to indicate to which group the constraints belong (not shown in FIG. 3C).

Although it is possible to enumerate all of the valid topological sorts for the constraint graph with many "OR" clauses, it may not be desirable as the resulting search can be computationally expensive, and the HM system may only need to generate some of the most cost-effective HM process plans. Therefore, instead of using the constraint graph to determine all valid topological sorts, corresponding to all feasible solutions, the system may create an array representation of the constraint graph and use it directly in the search to efficiently traverse the graph and find the best solutions without enumerating all of them.

For example, the partial order constraints for n primitives can be represented in a matrix form of size n×n, with n rows and n columns. Each (i, j) entry in the matrix may represent all of the non-redundant constraint clauses including the partial ordering of the form $P_i \rightarrow P_j$. In one embodiment, each partial ordering in the constraint matrix can be represented with a binary string and depicted in the constraint matrix as an integer that can be thought of as the unique decimal representation of the binary string. Specifically, a setting of "0" in the (i,j) entry of the constraint matrix means no constraints and a setting of "1" indicates a simple constraint $P_i \rightarrow P_j$ with no "OR" clauses.

When a constraint includes an "OR" clause, i.e., two or more groups of partial order constraints combined with "OR" within the group and with "AND" among the groups, each group affecting $P_i$ can be assigned a different bit position in the aforementioned binary string. If a partial order relation of the form $P_i \rightarrow P_j$ appears in a constraint including more than one group of constraints, then the corresponding matrix entry (i,j) may have more that one bit set to "1" in different positions assigned to these groups. If there are k "OR" clauses, or groups, affecting $P_i$, then these constraints may be represented using k different bit positions in the $i^{th}$ row of the matrix, with the relevant bit set to "1" for each entry (i,j) corresponding to $P_i \rightarrow P_j$ appearing in the related "OR" group. The number of the "OR" clauses, i.e., the assignment of bits, can be done on a per $i^{th}$ row basis, so that different rows of the matrix can reuse the bit numbering for more efficient representation.

FIG. 4A shows an example of a constraint matrix corresponding to a set of partial order constraints, in accordance with one embodiment of the present disclosure. In the example shown in FIG. 4A, the given set of partial order constraints 402-410 relates nine primitives and can be represented in a matrix form in a constraint matrix 412 including nine rows and nine columns. Constraints 402 and 404 can represent simple constraints with just one partial order relationship between two primitives, with no "OR" clause. Constraint 402, i.e., $P_3 \rightarrow P_5$, corresponds to the entry in the third row and fifth column in matrix 412. Since 402 is a simple constraint with no "OR" clause, the matrix entry (3,5), i.e., entry 414 in matrix 412, is set to "1." Similarly, constraint 404 is also a simple partial ordering of primitives with no "OR" clause, therefore the entry (1,8), i.e., entry 416 in matrix 412 is set to "1."

Constraints 406 and 408 represent "OR" constraints on primitive $P_1$ and these constraints can be assigned the second and the third bit from the right, i.e., bits corresponding to integers 2 and 4, respectively. In other words, since constraints 406 and 408 appear in the same row, i.e., the first row, of the matrix 412, the second and third right most bits can be set to "1," respectively. Furthermore, since $P_7$ appears in both constraints 406 and 408, the matrix entry (1,7), i.e., entry 420, can have the second and third right most bits set to "1," resulting in an integer "6." The primitives $P_6$ and $P_9$ appear only once in constraint 406, meaning that only second right most bit is set to "1," resulting in an integer "2", i.e., entries 422 and 418, respectively. In constraint 408, primitive $P_5$ appears only once and hence the third right most bit is set to "1" and results in the integer "4" in matrix entry 424. The "OR" constraint 410 on $P_4$ can be assigned the second bit from the right (corresponding to integer 2), because the bits are assigned row-wise and this is the only "OR" constraint with $P_4$ on the left of the partial ordering. Therefore, the partial order $P_4 \rightarrow P_7$ in "OR" constraint 410 is depicted as "2" (i.e., decimal representation of a binary string "10") in matrix entry (4,7), i.e., entry 426, and the partial order $P_4 \rightarrow P_9$ in "OR" constraint 410 is depicted as "2" in matrix entry (4,9), i.e., entry 428.

An HM system implementing a search technique can associate a constraint matrix 412 with a node in an A* search. The search system may assign a constraint matrix to a root node in a search, with the constraint matrix obtained by extracting all of the partial order constraints of the manufacturing problem and eliminating redundancies. A child node can be created when a primitive is applied to a state associated with the node, and the search system can generate a new constraint matrix for the child node. At each node in a search tree, the search system can identify a set of available actions based on a constraint matrix associated with the node under consideration. For example, a primitive $P_j$ can be an available action from a given state if the primitive has not been already applied and does not have any pre-conditions to be satisfied, e.g., does not have any required precursors. In other words, the $j^{th}$ column in the constraint matrix may not include "1" entries. However, entries greater than "1" can be allowed as they could represent a part of an "OR" constraint that can be satisfied through a different partial ordering that can be true. These constraints can significantly prune the state space for the search, thereby improving the efficiency of the search. Other approaches to pruning and other combinatorial or heuristic search algorithms can be employed in alternative embodiments.

In one embodiment, when the search system selects a primitive from a node in the search tree, the resulting child node's constraint matrix can be created from the parent node's constraint matrix. Specifically, in the parent node's constraint matrix, the row and column corresponding to the primitive action taken can be set to "0." The search system may update the remaining constraints accordingly to maintain consistency. For example, if by setting an entry in the constraint matrix to "0," an "OR" clause with two partial order relations is reduced to only one partial order relation, the entry corresponding to the remaining part of the "OR" clause can be set to "1." The resulting partial order corresponds to a new constraint that is to be satisfied.

FIG. 4B shows an example of a set of partial order constraints and constraint matrices associated with a parent node and a child node in a search tree, in accordance with one embodiment of the present disclosure. In FIG. 4B, an example set of partial order constraints is shown in table 432 corresponding to a constraint matrix 430. Constraint matrix 430 can correspond to a state or a node in a search tree and from this state a set of available actions can correspond to primitives: $P_2$, $P_4$, or $P_5$. The search system can select available actions from a node's constraint matrix 430, e.g., $P_2$ primitive can be selected as an available action if the second column in constraint matrix 430 does not have a "1" entry. The fourth and fifth columns of constraint matrix 430 also do not include a "1" entry, hence the search system can select also primitives $P_4$, or $P_5$ as available actions.

If the search system selects primitive $P_4$ for the child node's constraint matrix 434, then the search system may set all entries in the fourth row and column to "0," this can result in an entry "2" in the fifth row, i.e., entry (5,4) in matrix 430, that is to be set to "0." Now the fifth row may be left with just one "2" entry, i.e., at entry (5,1) in 430, and the search system can set this entry to "1" in the child node's constraint matrix 434. Therefore, the search system can provide a cascade of constraint reductions by selecting an available action from the set of available actions.

If the search system selects primitive $P_5$ instead of primitive $P_4$, then the fifth row and fifth column in a constraint matrix corresponding to the child node may be set to "0." Now since an entry "2" in the second row, i.e., entry (2,5) in matrix 430, was set to "0," the other "2" in the second row, i.e., entry (2,9) in matrix 430, can be set to "1." Furthermore, in the fourth row of matrix 430 the entry (4,5), i.e., "20," was set to "0," so this can result in the search system analyzing the other entries in the fourth row. Specifically, the search system may examine the bits corresponding to "16" and "4" in the fourth row. There are two more entries in the sixth and the ninth columns of matrix 430 with the bit position corresponding to the integer "4" set to "1." These entries correspond to a valid "OR" clause and may not be changed. Next, for the bit position representing the integer "16," there is just one entry, i.e., (4,8), in the eighth column that can be set to "1."

Since the entry (4,8) was originally a 24, the search system can examine other entries in the fourth row that represent an integer "8." The search system may then identify that there is just one other entry that corresponds to the bit position for the integer "8," i.e., "10" in the seventh column, and the search system may set this entry (4,7) to "1." Based on updating the entry (4,7) from "10" to "1," the search system may continue checking other entries having the bit position representing the integer "2" set to "1." The ninth column in the fourth row includes an entry with this bit set to "1", so this entry may be set to "1." Now there is only one entry remaining with the bit position representing the integer "4" set to "1," which corresponds to the sixth column, i.e., entry (4,6) in matrix 430, the search system may set this entry to "1." The resulting constraint matrix and the associated constraints for a child node when primitive $P_5$ is selected as the available action are shown in FIG. 4C.

FIG. 4C shows an example of a set of partial order constraints and a corresponding constraint matrix associated with a child node in a search tree, in accordance with one embodiment of the present disclosure. Constraint matrix 440 represents a resulting constraint matrix at a child node, obtained after the search system selects an available action $P_5$ based on the constraint matrix 430 in FIG. 4B. A set of partial order constraints shown in table 442 corresponds to constraint matrix 440 at a child node.

In one embodiment, the search system can use the constraint matrix to prune the search and to reduce the number of nodes that can be expanded in the search tree. Furthermore, the search system can discard duplicate nodes, i.e., nodes corresponding to the same state, thereby reducing the number of nodes that are searched. Typically, multiple combinations of primitives with different orderings may reach the same configuration. For example, applying multiple primitives of the same type (all additive or all subtractive) consecutively in any order may result in the same configuration. Candidate states that have the same atom configuration can be identified as duplicates. The search system may apply other strategies for pruning the search space, e.g., actions that may not result in any change in the state may be disallowed from that node and actions that do not move the search closer to the goal state may also be disallowed.

Furthermore, if at a search node where no true actions have yet been taken, the search system may completely discard primitives as actions. Removing a primitive can be considered as a new action which can result in updating the constraint matrix to generate a new child node. The search system may identify primitives that can be discarded along a path in the search tree, and can discard them at the beginning of the search, thereby limiting the number of options available at the later nodes in the search tree and improving the heuristic for the remainder of the search.

Although discarding some of the primitives may reduce the search space, in some scenarios discarding some of the primitives may not result in a successful solution. In other words, some search approaches may reach nodes that are dead ends, i.e., there are no feasible solutions from that node. Therefore, in one embodiment of the present disclosure, the search system can use a primitive reduction logic to intelligently limit the number of primitives that can be removed to improve the efficiency, if needed. The search system may apply a primitive reduction logic to perform two different tests. Specifically, the search technique can remove a primitive P from a set of primitives currently under consideration in a given state if the following two conditions are satisfied.

First, for every significant atom, meaning one whose inclusion or exclusion from the final state matters, the atom is addressable by (i.e., contained in, thus can be added/removed by) the remaining set of primitives. The term addressable here means that, if the atom is inside the design, then there is at least one additive primitive that contains the atom in its ROI, and if the atom is outside the design, then there is at least one subtractive primitive that contains the atom in its ROI, or the atom is empty.

Second, for every significant atom that has a P-conjugate, the atom and the conjugate are either both inside or both outside the final design. Two atoms can be said to be P-conjugates if they differ only at the $P^{th}$ digit in their encoding, i.e., the atoms are contained in the same subset of primitives except for primitive P, meaning that one of them is contained in P and the other one is not. Removing primitive P is equivalent to merging the two atoms into a single atom.

The search system can return a number N of the most cost-effective HM process plans, meaning that at each node the top N different paths and costs to that node may be maintained. In A* search, then, for example, the search can be said to be completed when N solutions have been identified whose cost is lower than a heuristic cost value of the current node under consideration.

In one embodiment, the HM system can improve the search by applying good heuristics. For example, in A* search, a cost function is included to compute the cost of actions taken so far at a given state, whereas a heuristic function is included to estimate the cost of remaining actions. If the heuristic is admissible, i.e., underestimates the remaining cost, the search will eventually find the optimal solution. The closer that estimate is to reality, the higher the likelihood of finding that solution earlier is. Selecting a good heuristic that is computationally cheap may provide an improved and time-effective search. A number of such good quality heuristics can be selected; one of these heuristics is described below.

For each significant atom, the search algorithm can determine a cheapest cost-per-volumes for all remaining additive and for all remaining subtractive primitives that can add or remove that atom. The search algorithm can also determine a current setting of the atom, i.e., "1" or "0," and a goal state of the atom. If the atom bit is "0" and is desired to remain "0," then such a case can be denoted as a "0→0" case. In the "0→0" case, if there are still additive primitives remaining that act on the atom, then there must be at least one additive flip and one subtractive flip remaining. Otherwise, there may be no flips remaining. If the atom bit is "1" and is desired to remain "1," then such a case can be denoted as a "1→1" case. In the "1→1" case, if there are still subtractive primitives remaining that act on the atom, then there must be at least one subtractive flip and one additive flip remaining. Otherwise, there may be no flips remaining.

If the atom bit is "0" and is desired to be "1," then such a case can be denoted as a "0→1" case. In the "0→1" case, if there are still subtractive primitives remaining that can remove the atom and there is a constraint between some additive and subtractive primitives which requires an additive primitive to precede a subtractive primitive, then there must be at least two additive flips and one subtractive flip remaining. Otherwise, there must be at least one additive flip remaining. If the atom bit is "1" and is desired to be "0," then such a case can be denoted as a "1→0" case. In the "1→0" case, if there are still additive primitives remaining that can add the atom and there is a constraint between some additive and subtractive primitives which requires a subtractive primitive to precede an additive primitive, then there must be at least two subtractive flips and one additive flip remaining. Otherwise, there must be at least one subtractive flip remaining.

The search system may use a minimum number of subtractive and additive flips for each atom with minimum subtractive and additive cost, respectively, to calculate the minimum cost for each atom. The final minimum cost heuristic can be obtained by summing the costs across all the significant atoms.

In one embodiment, the search system may apply an alternative heuristic for a case where it may not be guaranteed that the remaining primitives may be used (as they may later be discarded from the given state). Specifically, the search system may use a heuristic that first determines for each significant atom, the cheapest cost-per-volumes for all the remaining additive and for all the remaining subtractive primitives that may add or remove the atom. Further, this heuristic may determine for each significant atom, a current setting ("1" or "0") and a goal state of the atom. If the current setting is different from the goal state, then the search system using this heuristic may multiply the atom volume by the relevant cheapest primitive, i.e., additive for current state "0" and goal state "1," and a subtractive for the reverse scenario. The search system can then compute a final cost by summing the costs across all the significant atoms.

Figure 5:
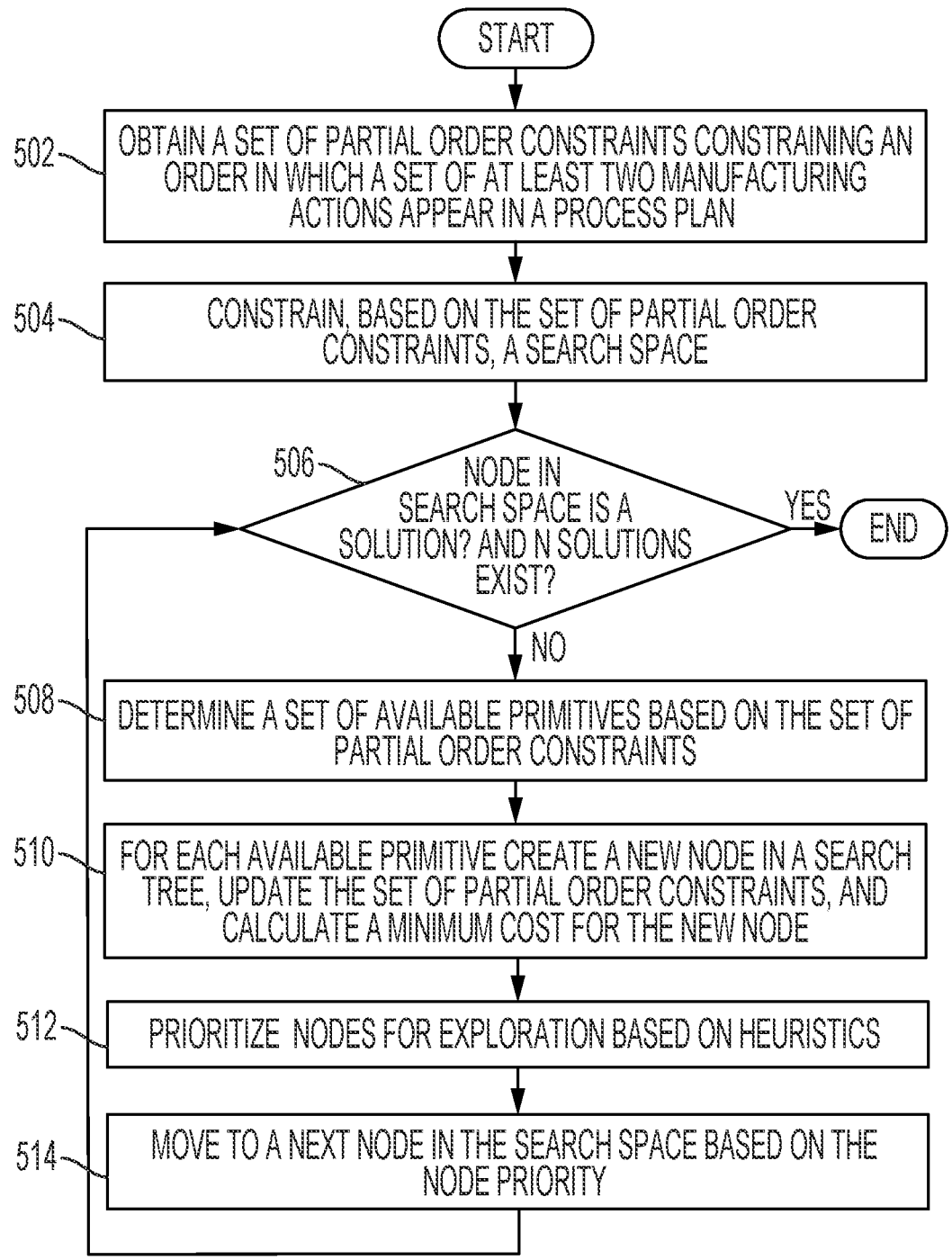
FIG. 5 presents a flowchart illustrating a process for facilitating a search for cost-effective HM process plans, in accordance with one embodiment of the present disclosure.

FIG. 5 presents a flowchart illustrating a process for facilitating a search for cost-effective HM process plans, in accordance with one embodiment of the present disclosure. During operation, the system can obtain a set of partial order constraints constraining an order in which a set of at least two manufacturing actions appear in a process plan (operation 502). The set of partial order constraints can be represented by a constraint matrix. Specifically, for n primitives the system can generate the constraint matrix of the form n×n. Each entry in the constraint matrix can represent a binary string (i.e., sequence of bits) that can be represented as an integer in the constraint matrix. Further, each entry with a non-zero number can correspond to one or more partial orderings of the given set of primitives. The system can constrain a search space based on the set of partial order constraints (operation 504). For example, the system may assign the constraint matrix to a root node or a given node in a search space. A child node can be created when a primitive is applied to a state associated with the node, and the search system can generate a new constraint matrix for the child node. At each node in a search tree, the search system can determine whether the node is a solution and whether N solutions or process plans have been identified (operation 506). The system can determine that the search is completed when N solutions have been identified whose cost is lower than a heuristic cost value of the current node under consideration in the search tree. In other words, the system may determine a set of optimized process plans represented by orderings of actions that produce a desired final state in a cost-effective manner. When the condition in operation 506 is true, the operation terminates. When the condition in 506 is false, i.e., N solutions have not been identified, the system may continue to operation 508 to determine a set of new available primitives associated with a new child node based on the set of partial order constraints (operation 508).

For each available primitive, the system can create a new node in the search tree, update the set of partial order constraints, and can calculate a minimum cost for the new node (operation 510). The system can prioritize nodes in the search space based on one or more heuristics (operation 512). In response to prioritizing the nodes, the system may move to the next node in the search space based on the node priority (operation 514). The system can then continue operation at 506 to determine whether the current node under consideration corresponds to a solution and whether N solutions have been identified in total. Therefore, the system can efficiently determine a solution that is cost-effective by pruning the search space to discard primitives, prioritizing primitives at a given node in a search tree based on a set of updated partial order constraints, available primitives, and one or more heuristics.

Exemplary Computer System and Apparatus

Figure 6:
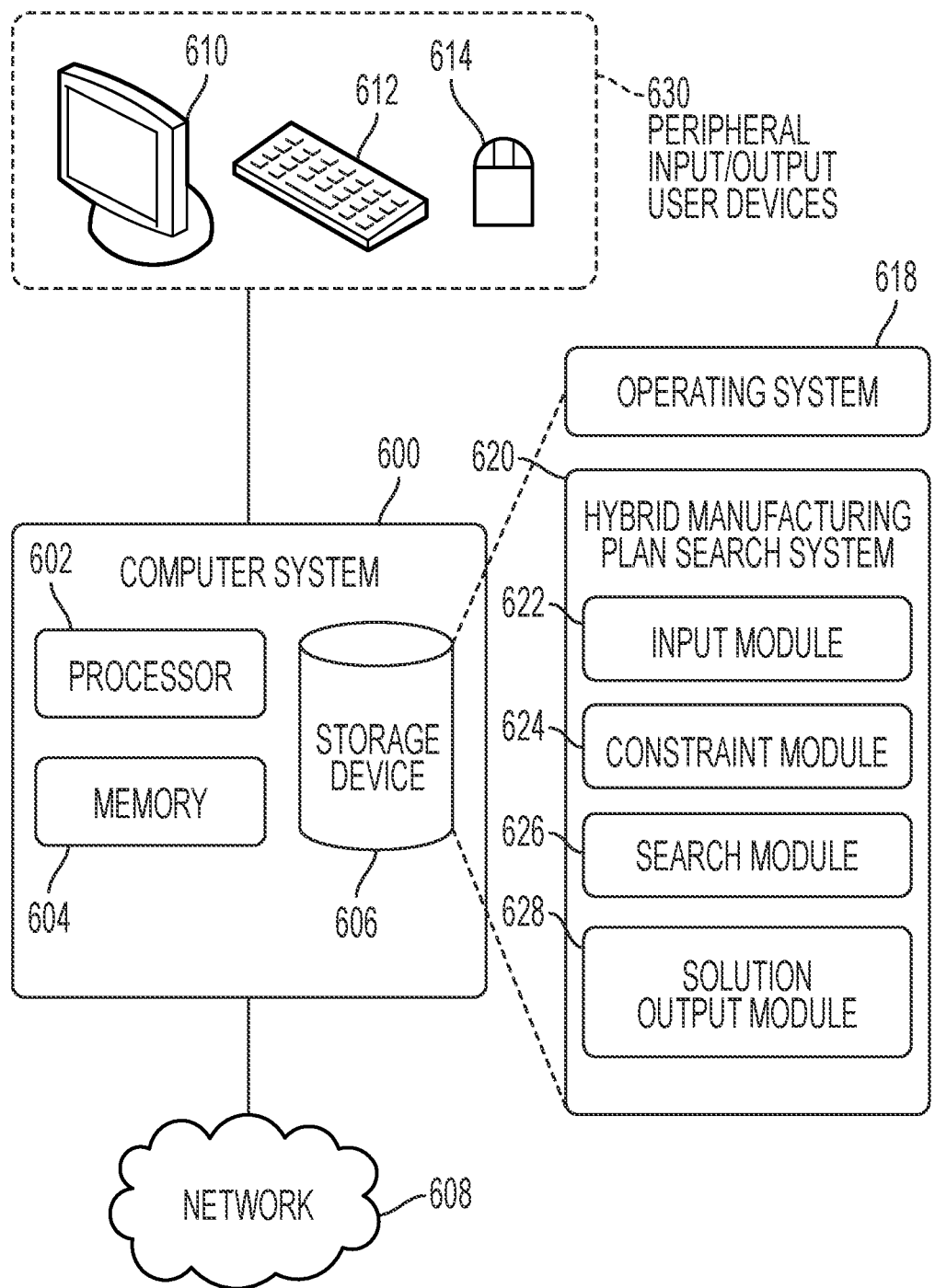
FIG. 6 illustrates an exemplary computer system for facilitating a search for cost-effective HM process plans, in accordance with one embodiment of the present disclosure.

FIG. 6 illustrates an exemplary computer system for facilitating a search for cost-effective HM process plans, in accordance with one embodiment of the present disclosure. In this example, computer system 600 can include a processor 602, a memory 604, and a storage device 606. Computer system 600 can be coupled to peripheral input/output (I/O) user devices 630, e.g., a display device 610, a keyboard 612, and a pointing device 614, and can also be coupled via one or more network interfaces to a network 608. Storage device 606 can store instructions for an operating system 618 and a hybrid manufacturing plan search system 620.

In one embodiment, HM process plan search system 620 can include instructions, which when executed by processor 602 can cause computer system 600 to perform methods and/or processes described in this disclosure. HM process plan search system 620 can include an input module 622 to receive a set of encodings of atomic regions of the Euclidean space with respect to their inclusion in primitives and in the desired final state. HM process plan search system 620 can further include instructions implementing a constraint module 624 for efficiently representing the set of constraints in a constraint matrix form that can represent one or more partial orderings of the given set of primitives. Further, the one or more partial orderings of primitives represented in the constraint matrix can be depicted as integers, which are decimal representations of binary strings depicting how the partial order constraints are combined via "AND" and "OR."

HM process plan search system 620 can include a search module 626, which can implement a search algorithm augmented with one or more methods to prune the search space, as well as efficient heuristics, thereby resulting in an efficient and compact search for a set of optimized orderings of the primitives for manufacturing the desired shape in a cost-effective way. Solution output module 628 can output the set of optimized orderings of the primitives that correspond to the cheapest HM process plans for manufacturing the shape.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for facilitating a search for process plans to manufacture an object with a combination of additive and subtractive manufacturing actions, the method comprising:

obtaining, by a computer, a set of partial order constraints constraining an order in which a set of manufacturing actions associated with a manufacturing process of the object, wherein a respective manufacturing action includes an additive or subtractive manufacturing operation corresponding to addition or removal, respectively, of a predefined three-dimensional (3D) region of the object;

constraining, based on the set of partial order constraints, a search space, wherein the search space corresponds to a tree in which nodes represent the object's state and edges represent available actions at corresponding nodes;

determining a set of sequences of actions by traversing the search space based on the set of partial order constraints;

estimating, based on a heuristic function, a cost of remaining actions at each node by:

determining, for each atom, a number of addition or removal of the atom needed to reach a final state for the object, wherein the atom indicates a smallest spatial regions that can be added or removed as a unit; and determining a low threshold for a remaining cost based on a cost-per-unit-volume of an available action, the number of addition or removal per atom, and the volume of the corresponding atom;

selecting, from the set of sequences of actions, a sequence of actions as a process plan, wherein the sequence of actions, which corresponds to a path on the search tree, produces the desired final state; and providing the process plan to a controller configured to manage the manufacturing process of the object.

2. The method of claim 1, wherein the manufacturing actions include Boolean operations of the object's state with pre-defined regions of primitives, and wherein the intersections of the primitives produce a plurality of atoms.

3. The method of claim 2, wherein the atoms are represented based on binary strings that encode inclusion in the primitives and wherein the state of the manufactured shape at a respective node and a desired target shape are represented based on binary strings of inclusions of atoms.

4. The method of claim 1, further comprising:

performing, at a respective node of the search tree, one or more of the following:
  determining, for a primitive, an applied action that satisfies all pre-conditions imposed by the set of partial order constraints;
  determining a change in the state of a manufactured shape after applying the action;
  updating the set of partial order constraints for remaining primitives; and
  determining a set of available primitives for subsequent actions.

5. The method of claim 4, further comprising pruning the search space by discarding primitives as potential actions at a node based on the updated partial order constraints, available primitives, and pruning strategies.

6. The method of claim 1, further comprising:

identifying combinations of primitives with different orderings that result in duplicate states in the process plan; and retaining at least one combination of the primitives corresponding to the duplicate state and discarding remaining combinations of the primitives.

7. The method of claim 1, further comprising determining the process plan that satisfies the set of partial order constraints based on a cost function, wherein the cost function is based on atoms that a respective primitive adds or removes.

8. The method of claim 1, further comprising:

calculating a cost of a respective action by multiplying a cost-per-unit-volume of the action by a volume of atoms added or removed by the action; and calculating a total cost at a respective node by summing respective costs of all previous actions.

9. The method of claim 1, wherein the set of partial order constraints at a respective node is represented by a constraint matrix whose entries are binary strings, and wherein the binary strings are used for encoding a logical statement by combining the partial order constraints via disjunctions and conjunctions.

10. A computer system comprising:

a processor; and a storage device coupled to the processor and storing instructions, which when executed by the processor cause the processor to perform a method for facilitating a search for process plans to manufacture an object with a combination of additive and subtractive manufacturing actions, the method comprising:

obtaining a set of partial order constraints constraining an order in which a set of manufacturing actions associated with a manufacturing process of the object, wherein a respective manufacturing action includes an additive or subtractive manufacturing operation corresponding to addition or removal, respectively, of a predefined three-dimensional (3D) region of the object;

constraining, based on the set of partial order constraints, a search space, wherein the search space corresponds to a tree in which nodes represent the object's state and edges represent available actions corresponding nodes;

determining a set of sequences of actions by traversing the search space based on the set of partial order constraints;

estimating, based on a heuristic function, a cost of remaining actions at each node by:
  determining, for each atom, a number of addition or removal of the atom needed to reach a final state for the object, wherein the atom indicates a smallest spatial regions that can be added or removed as a unit; and
  determining a low threshold for a remaining cost based on a cost-per-unit-volume of an available action, the number of addition or removal per atom, and the volume of the corresponding atom;

selecting, from the set of sequences of actions, a sequence of actions as a process plan, wherein the sequence of actions, which corresponds to a path on the search tree, produces the desired final state; and providing the process plan to a controller configured to manage the manufacturing process of the object.

11. The computer system of claim 10, wherein the manufacturing actions include Boolean operations of the object's state with pre-defined regions of primitives, and wherein the intersection of the primitives produces a plurality of atoms.

12. The computer system of claim 11, wherein the atoms are represented based on binary strings that encode inclusion in the primitives, and wherein the state of the manufactured shape at a respective node and a desired target shape are represented based on binary strings of inclusions of atoms.

13. The computer system of claim 10, wherein the method further comprises:

performing at a respective node of the search tree, one or more of the following:
  determining, for a primitive, an applied action that satisfies all pre-conditions imposed by the set of partial order constraints;
  determining a change in the state of a manufactured shape after applying the action;
  updating the set of partial order constraints for remaining primitives; and determining a set of available primitives for subsequent actions.

14. The computer system of claim 13, wherein the method further comprises pruning of search space by discarding primitives as potential actions at a node based on the updated partial order constraints, available primitives, and pruning strategies.

15. The computer system of claim 10, wherein the method further comprises:

identifying combinations of primitives with different orderings that result in duplicate states in the process plan; and retaining at least one combination of the primitives corresponding to the duplicate state while discarding remaining combinations of the primitives.

16. The computer system of claim 10, wherein the method further comprises determining the process plan that satisfies the set of partial order constraints based on a cost function, wherein the cost function is based on atoms that a respective primitive adds or removes.

17. The computer system of claim 10, wherein the method further comprises:
calculating a cost of a respective action by multiplying a cost-per-unit-volume of the action by a volume of atoms added or removed by the action; and
calculating a total cost at a respective node by summing respective costs of all previous actions.

18. The computer system of claim 10, wherein the set of partial order constraints at a respective node is represented by a constraint matrix whose entries are binary strings, and wherein the binary strings are used for encoding a logical statement by combining the partial order constraints via disjunctions and conjunctions.

* * * * *